United States Patent [19]

Mitsui

[11] 4,110,895
[45] Sep. 5, 1978

[54] APPARATUS FOR MANUFACTURING LAMINATED CORES

[75] Inventor: Yoshiaki Mitsui, Kitakyushu, Japan

[73] Assignee: Mitsui Mfg. Co., Ltd., Kitakyushu, Japan

[21] Appl. No.: 819,479

[22] Filed: Jul. 27, 1977

[51] Int. Cl.$^2$ ............................................. H02K 15/02
[52] U.S. Cl. .................... 29/564.2; 29/564.6; 29/598; 29/609; 29/736; 72/327; 72/482; 83/527; 83/640
[58] Field of Search ................. 29/732, 736, 598, 596, 29/609, 564.2, 564.6, 564.7, 565; 72/326, 327, 329, 482; 83/527, 529, 530, 640; 310/42, 216, 217

[56] References Cited

U.S. PATENT DOCUMENTS

| | | | |
|---|---|---|---|
| 2,975,312 | 3/1961 | Ploran | 310/217 |
| 3,203,077 | 8/1965 | Zimmerle | 29/598 |
| 3,590,208 | 6/1971 | Sandkrug et al. | 29/596 X |
| 3,939,686 | 2/1976 | Walters et al. | 83/529 X |

Primary Examiner—Carl E. Hall

Attorney, Agent, or Firm—Wegner, Stellman, McCord, Wiles & Wood

[57] ABSTRACT

A laminated core manufacture wherein a plurality of apertured laminations are provided with projections formed from the portion of the sheet from which the apertures are formed to define an interlocked laminated stack. The first of the laminations is provided with a through aperture with the projection being eliminated so as to define a nonprojecting surface in the first of the laminations of the stack, with the projections of each of the subsequent laminations extending into and being interlocked with the preceding lamination in the aperture thereof. The punching apparatus for providing the apertures and projections is selectively operated to define either the formed aperture and projection structure or a blanked out apertured structure. The blanked out apertured structure defines the first of the laminations of the stack. The extent of the projections from the laminations is preselected to be no greater than the thickness of the laminations so that the projection of the laminations superjacent the first lamination is received fully within the blanked out aperture thereof. The blanked out laminations may be indexed to define a skewed axis dynamoelectric structure.

10 Claims, 12 Drawing Figures

FIG. 10
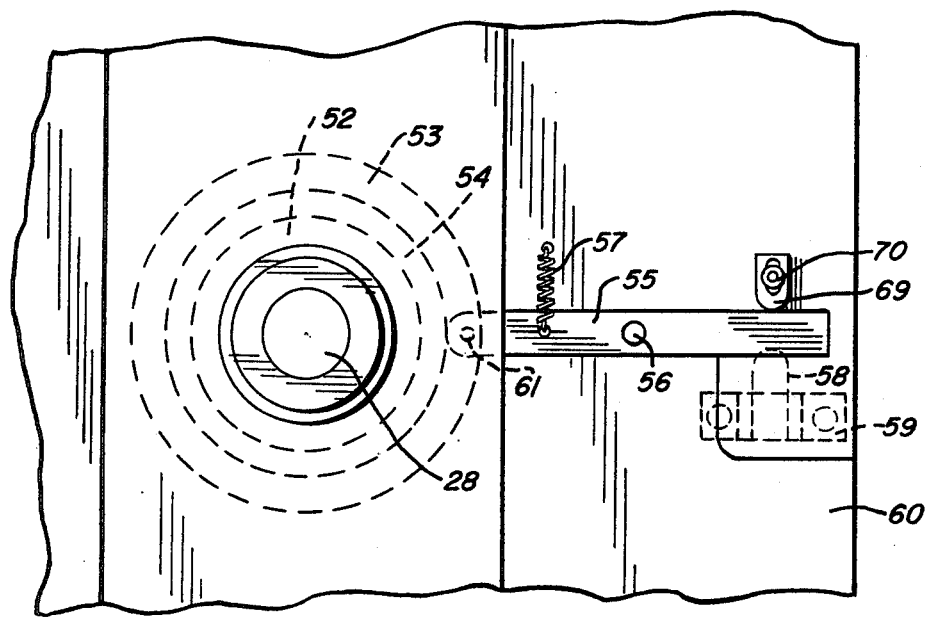
FIG. 11
FIG. 12
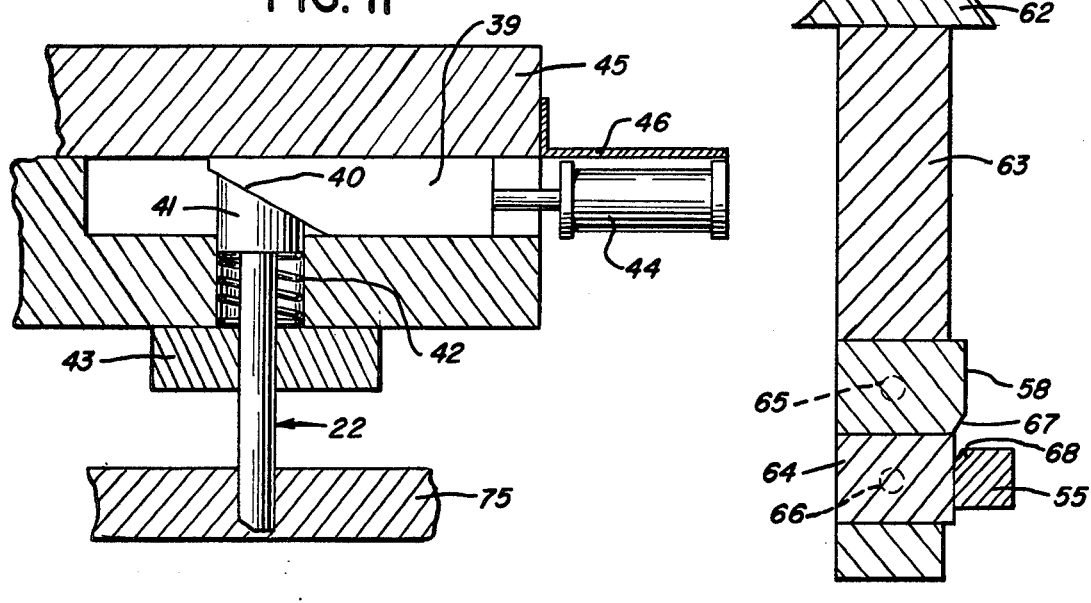

APPARATUS FOR MANUFACTURING LAMINATED CORES

BACKGROUND OF THE INVENTION

1. Field of the Invention

This invention relates to dynamoelectric manufacture and in particular to an apparatus for forming a laminated dynamoelectric structure.

2. Description of the Prior Art

In U.S. Pat. No. 3,202,851 of W. J. Zimmerle et al, a manufacture of a dynamoelectric machine is illustrated interlocked laminations are provided for forming a stator assembly. The laminations are provided with formed projections to define the desired interlocking means between the respective laminations.

Additional prior art patents which show the state of the art in connection with apparatus and processes for forming such stacked laminated structures includes Phelps et al U.S. Pat. No. 1,817,462, Johnson U.S. Pat. No. 1,861,059, Zimmerle U.S. Pat. No. 3,210,824, Bausman et al 1,874,158, Heftler 2,283,629, Goran 2,368,295, Roters 2,483,024, Korski 2,763,916, Ebbert 2,933,204, Westphalen 2,971,106, Ploran 2,975,312, Hicks 2,996,791, Rediger 3,012,162, Hopp et al U.S. Pat. No. 3,060,992, Post U.S. Pat. No. 3,062,262, Boyer U.S. Pat. No. 3,070,058, Zimmerle U.S. Pat. No. 3,110,831, Zimmerle U.S. Pat. No. 3,203,077, and MacLaren U.S. Pat. No. 2,998,638. Additionally, Canadian Pat. No. 603,175 of Gordon W. Herzog, and German Pat. No. 917,626 teach interlocked laminated sheet structures for such structures.

SUMMARY OF THE INVENTION

While the above discussed patents show a wide range of different techniques and apparatuses for providing such laminated dynamoelectric structures, the present invention comprehends an improvement thereover wherein the stacked assembly is provided by new improved apparatus for facilitated and low cost construction.

More specifically, the present invention comprehends the provision of an apparatus for forming from a metal sheet a laminated dynamoelectric structure having a plurality of stacked interlocked formed laminations including means defining a punching station having a punch for punching a portion of the sheet to form therein a displaced projection, the portion of the sheet from which the projection is displaced defining an aperture means advancing the sheet to a blanking station, means at the blanking station for blanking out the portion to define a formed lamination, the punching station means, advancing means, and blanking station means being operated seriatim to cause a series of such sheet portions to be formed with the projections and apertures at the punching station and advanced sequentially to the blanking station whereat the formed laminations are blanked out and stacked, and control means for selectively causing the punching station means to continue the punching operation of the punch sufficiently to blank out the projection of the first of the series of the sheet portions from the first of the laminations of the stack. The apparatus may be arranged to provide an indexing of the respective laminations so as to provide a skewed axis dynamoelectric structure as desired.

In the illustrated embodiment, the control means comprises means for varying the stroke of the punch means so as to provide the selective blanking out of the projection from the first lamination of the stack.

The projections extend from the lamination preferably a distance no greater than the thickness of the lamination so that the projection extending into the blanked out aperture of the first lamination is effectively fully received therein.

In the illustrated embodiment, the control of the punch is effected by suitable cam means which effectively varies the stroke of the punch to provide the desired projection formation or blanked out operation.

The interlocked stacked assembly may be subjected to a press fit force prior to the delivery of the assembly from the blanking station to maintain the assembly during subsequent manufacturing operations.

The apparatus of the present invention comprises an improved apparatus for providing a low cost, efficient manufacture of a dynamoelectric structure as discussed above.

BRIEF DESCRIPTION OF THE DRAWING

Other features and advantages of the invention will be apparent from the following description taken in connection with the accompanying drawing wherein:

FIG. 10 is a fragmentary plan view illustrating the indexing means of the apparatus;

FIG. 11 is a fragmentary vertical section illustrating the indexing means; and

FIG. 12 is a further vertical section illustrating the indexing means.

DESCRIPTION OF THE PREFERRED EMBODIMENT

Figure 1:
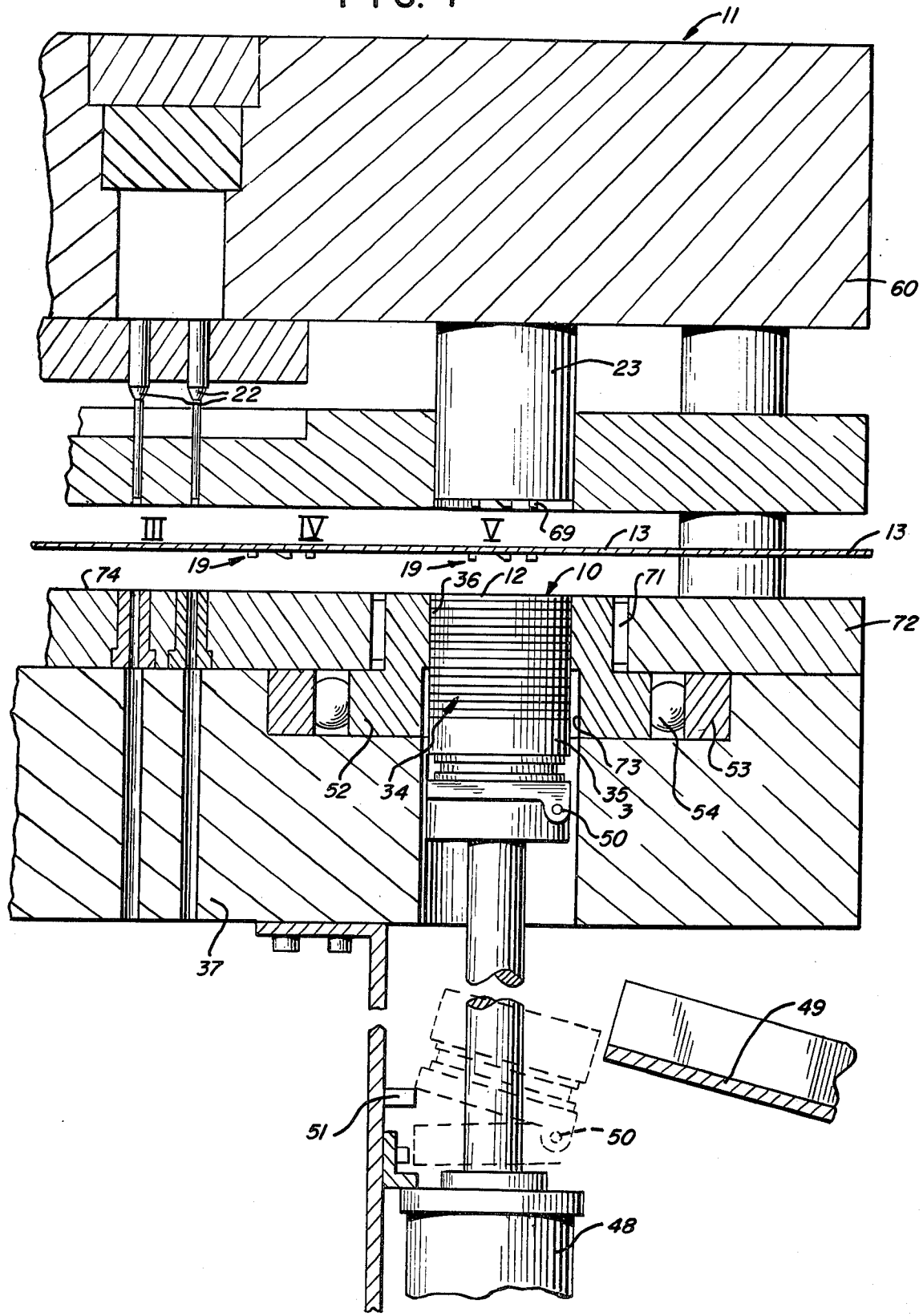
FIG. 1 is a fragmentary vertical section of an apparatus embodying the invention.

In the exemplary embodiment of the invention as disclosed in the drawing, a laminated dynamoelectric structure generally designated 10, as shown in FIG. 1, may be formed to comprise the rotor of an electric motor, or the like. Structure 10 is formed in an improved apparatus generally designated 11 defining a plurality of forming stations. The structure 10 comprises a plurality of interlocked laminations 12 which may be formed from a sheet metal strip 13 by a series of successive forming operations as shown in FIG. 2, in the apparatus 11.

Figure 2:
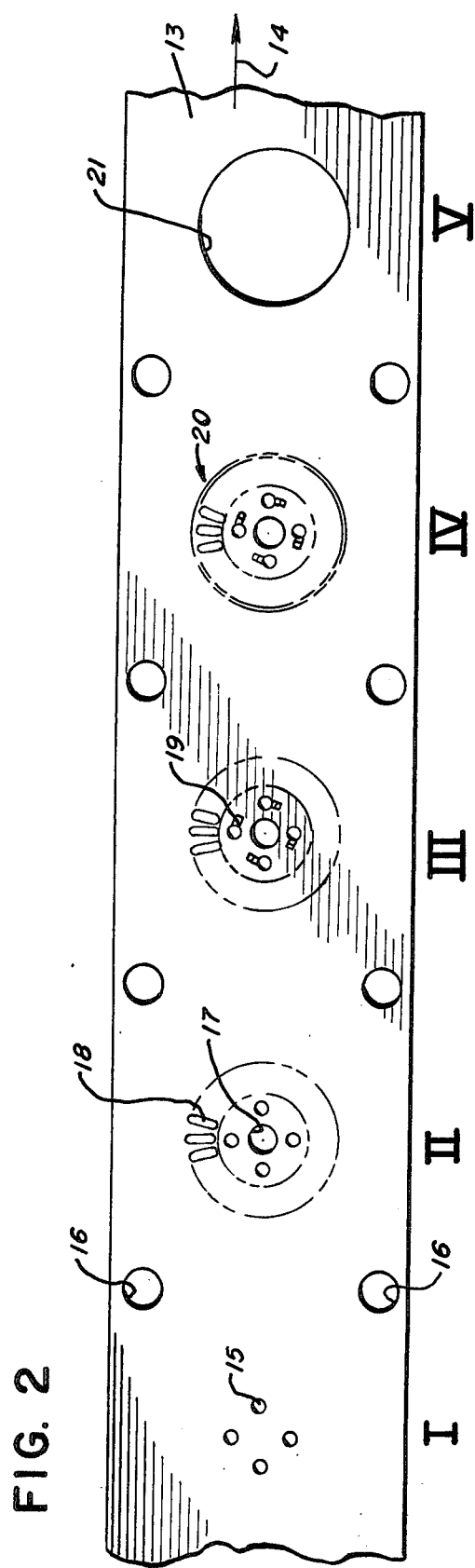
FIG. 2 is a top plan view of the formed sheet metal strip illustrating different steps in the forming of the dynamoelectric machine lamination therein.

More specifically as illustrated in FIG. 2, the sheet metal strip 13 may be sequentially advanced in the direction of the arrow 14 within apparatus 11 so as to perform a series of operations on spaced portions of the strip as it is advanced. Illustratively, at station I, a plurality of skew control holes 15 are provided in the strip concurrently with a pair of pilot holes 16. At station II in apparatus 11, a central shaft hole 17 and an annular array of rotor slots 18 are formed in the strip concentrically of the control holes 15.

At station III, lamination interlock means 19 are formed in the sheet. The thusly formed portion 20 of the sheet is moved through station IV to a blanking station V wherein the formed portion is blanked from the sheet leaving hole 21 therein.

The sheet may be further advanced beyond station V for forming of a stator structure concentrically of the hole 21. However, the present invention is concerned with the forming of the portion 20 and the stacking thereof to define the structure 10.

Stations III, IV, and V are identified on FIG. 1 illustrating the arrangement of the apparatus 11 for providing the interlocking means 19. As shown in FIG. 1, station III includes a plurality of forming dies 22 for concurrently forming the interlocking means 19 therein. Station V includes a combination blanking, indexing and stacking die 23.

Figure 3:
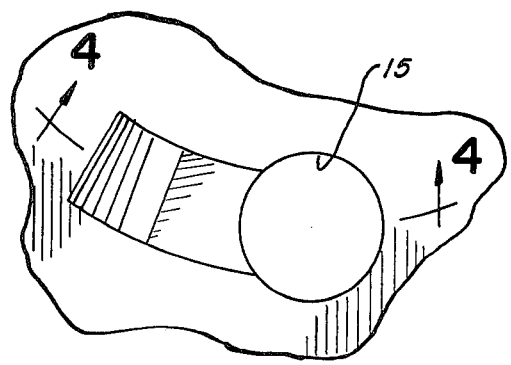
FIG. 3 is a fragmentary plan view of a portion of the strip defining the interlock means of the lamination.
Figure 4:
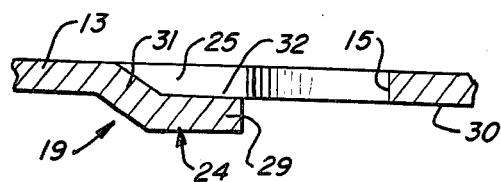
FIG. 4 is a fragmentary vertical section taken substantially along the line 4—4 of FIG. 3.

Referring now more specifically to FIGS. 3-9, the interlocking means 19 illustratively comprises a projection 24 formed from the sheet 13 by the die 22. The projection is offset from the sheet so as to define an aperture 25 opening to the hole 15, as shown in FIGS. 3 and 4.

The lower edge 26 of the forming die 22 is provided with a bevel surface 27 and a planar transverse surface 28 so as to cause the projection 24 to define an offset portion 29 spaced below the lower surface 30 of the sheet 13 and an angled connecting portion 31 connecting the offset portion 29 to the body of the sheet.

As shown in FIG. 4, offset portion 29 may be displaced downwardly the thickness of the sheet 13 so as to have its upper surface 32 substantially coplanar with the lower surface 30 of the sheet.

Figure 6:
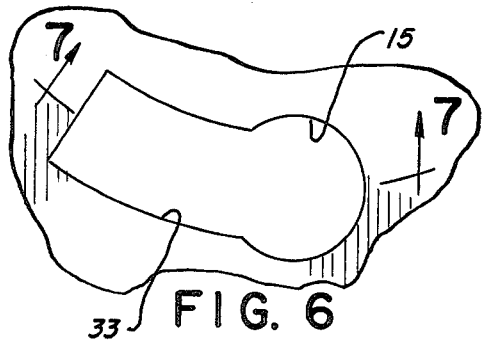
FIG. 6 is a fragmentary plan view of the portion of a lamination intended to comprise the first lamination of the stack.
Figure 8:
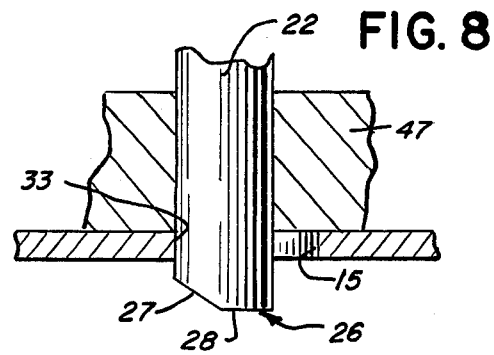
FIG. 8 is a fragmentary vertical section illustrating the operation of the punch means in forming the blanked out apertured portion of FIGS. 6 and 7.
Figure 7:
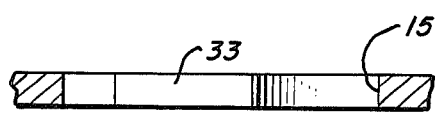
FIG. 7 is a fragmentary vertical section taken substantially along the line 7—7 of FIG. 6.
Figure 5:
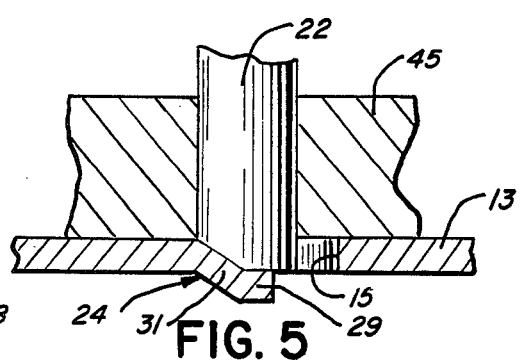
FIG. 5 is a vertical section illustrating the operation of the punch in forming the aperture and projection means of FIGS. 3 and 4.

As further illustrated in FIGS. 6-8, punch die 22 may be selectively caused to have a greater downward stroke than in forming the interlock projection 24 of FIGS. 3-5 whereby the projection 24 may be effectively blanked out so as to leave a through opening 33 free of any downwardly extending projection 24.

Figure 9:
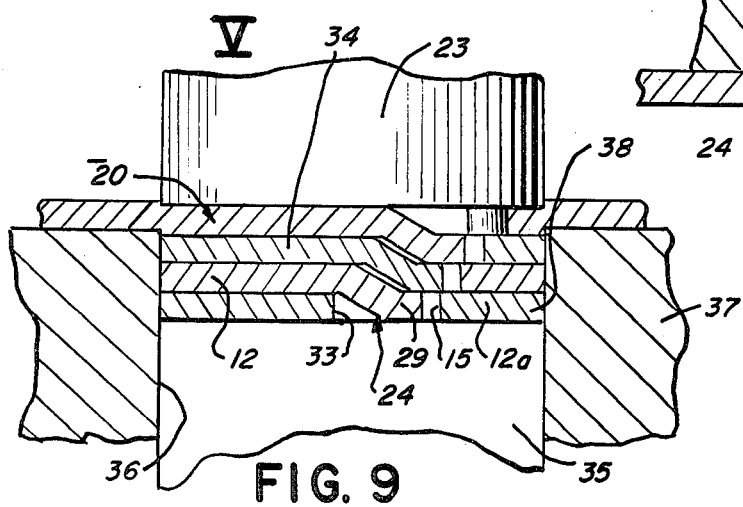
FIG. 9 is a fragmentary vertical section illustrating the step of blanking out the formed portion of the sheet to define the completed lamination and the placement of the blanked out lamination on the preceding stacked laminations.

Referring now to FIG. 9, the stacked assembly 34 may be carried on a support 35 received in an opening 36 in a base portion 37 of the apparatus 11 at station V. The blanking die 23 is arranged to blank out the formed portion 20 of the sheet so as to define the laminations 12. As the laminations are blanked out to form the hole 21, they are urged downwardly against the uppermost lamination carried by the support 35 into the hole 36 with the stacking of the laminations continuing until the completed stacked assembly 34 is provided.

As shown in FIG. 9, the lowermost, or first, of the laminations 12a on support 35 comprises a lamination defined by the blanked out opening 33 illustrated in FIGS. 6-8. Thus, as no projection 24 depends from the first lamination 12a, the lamination may rest on the flat upper surface 38 of support 35 with the projection 24 of the superjacent lamination extending downwardly into the opening 33 with the offset portion 29 thereof being effectively fully received within the opening 33 and hole 15, as shown in FIG. 9. As further shown in FIG. 9, each of the successively superjacent laminations has the downwardly extending projections 24 thereof received in the apertures 25 of the subjacent lamination so as to define interlocking means between the respective laminations of the stack.

The means for controlling the stroke of the punch 22 is illustrated in FIG. 11 to include a cam 39 engaging a cam surface 40 on an upper end portion 41 of the punch 22. Punch portion 41 is biased upwardly by a suitable spring 42 acting between the portion 41 and a spring retainer 43.

Movement of cam 39 is controlled by a solenoid 44 carried by the punch holder 45 on a suitable bracket 46. As will be obvious to those skilled in the art, the solenoid 44 may be selectively operated suitably to cause the punch 22 to move downwardly through the guide 47 to form the projection 24, as shown in FIG. 5, or further downwardly to blank out the projection and form the hole 33, as shown in FIG. 8. Thus, the solenoid may be operated to provide the full movement of the punch 22 of FIG. 8 at preselected intervals so as to form the lowermost lamination 12a of the series when desired.

As further shown in FIG. 1, the support 35 may be carried on a suitable air cylinder 48 which allows the stacked assembly 34 to move downwardly through the hole 36 until the desired height of the stacked assembly is reached. At that time, the air cylinder may be operated to provide a high compressive force to the stacked assembly so as to provide a press fitted interlocking of the projections with the edges of the apertures of the subjacent laminations so as to provide a maintained-integrity assembly which may be delivered from the blanking station onto a suitable guide 49 for delivery from the apparatus 11, as desired. Thus, as shown in FIG. 1, when the air cylinder is retracted upon completion of the press fitting interlocking operation, the support 35 may be pivoted on a suitable pivot 50 by means of a pin 51 to permit the stacked assembly to move onto the guide for subsequent delivery.

As indicated briefly above, it is desired to provide an indexing of the respective laminations as they are interlocked in the stacked assembly 34. For this purpose, the base 37 defines a die including an inner ring 52, an outer ring 53, and an interposed one-way clutch 54.

As the blanking die 23 is brought downwardly to blank out the lamination from the sheet, a rotation of the blanked out lamination is concurrently effected to as to provide the desired skewing angle in the stacked assembly of laminations. For this purpose, an indexing lever 55 is mounted on a pivot 56 and biased by means of a spring 57 against a cam 58 adjustably mounted by suitable bracket 59 to the die holder 60. The end of the lever is connected to the outer ring 53 by a suitable pin 61. The punch holder 52 carries the camming frame 63 for guiding the cam 58 and a second cam 64 for controlling the movement of lever 55, as seen in FIG. 12. The position of cam 58 may be adjusted by means of a locking screw 65 and the position of cam 64 may be adjusted by means of a locking screw 66.

As shown in FIG. 12, cam 58 defines a bevel surface 67 cooperating with a complementary bevel surface 68 on the lever 55 to effect the desired indexing movement of the outer ring 53.

As further shown in FIG. 1, the punch 23 may be provided with projections 69 which are complementary to the formed apertures 25 so as to provide a snug fit therein during the blanking out operation when the blanking punch 23 is brought downwardly against the sheet 13 from the position of FIG. 1.

Thus, when the punch 23 brings the blanked out lamination from sheet 13 onto the top lamination of the stack, the die 52 is concurrently indexed to provide the desired skewed relationship of the successive laminations interlocked in the stacked assembly 34. In the illustrated embodiment, a stop 69 is provided on the die holder to limit the swinging of the lever 55. The stop may be adjustably secured to the die holder by a suitable bolt 70 to permit adjusting the lever to provide the desired skew angle.

To facilitate movement of the die 52, needle bearings 71 may be provided between the die portion 52 and the die holder 72, as shown in FIG. 1.

As further shown in FIG. 1, the inner die ring 52 may be undercut at 73 to facilitate the downward movement of the stacked laminations 34.

In the forming operation, the sheet 13, as shown in FIG. 1, is maintained in a floating disposition above the upper surface 74 of the die plate. A press stripper 75 is provided for urging the sheet 13 downwardly onto the die plate to permit the punching operation effected by punch 22, as discussed above, against the upper surface 74 of the die. As discussed above, preselected ones of the punching operations may be caused to effect the desired blanking operation of FIGS. 6–8 under the control of cam 39 and solenoid 44 through suitable control of the solenoid. Thus, the present invention comprehends an improved, simplified apparatus for controlling the arrangement of the interlock means of the respective laminations of the stacked assembly by suitably controlling the movement of the punch 22. The invention further comprehends the improved facilitated forming of the stacked assembly by means of the cutoff punch 23 which blanks out the lamination from the formed portion 20 of the sheet 13 and provides an indexed, stacked association of the laminations with the first lamination 12a being defined by the through opening 33 so as to permit the support thereof directly on the upper surface 38 of the support 35.

The foregoing disclosure of specific embodiments is illustrative of the broad inventive concepts comprehended by the invention.

I claim:

1. In an apparatus for forming from a metal sheet a laminated dynamoelectric structure having a plurality of stacked interlocked formed laminations, the improvement comprising:

means defining a punching station having a punch for punching a portion of the sheet to form therein a displaced projection, said portion of the sheet from which the projection is displaced defining an aperture;

means advancing the sheet to a blanking station;

means at the blanking station for blanking out said portion to define a formed lamination, said punching station means, advancing means, and blanking station means being operated seriatim to cause a series of such sheet portions to be formed with said projections and apertures at said punching station and advanced sequentially to said blanking station whereat the formed laminations are blanked out and stacked; and control means for selectively causing the punching station means to continue the punching operation of said punch sufficiently to blank out the projection of the first of the series of said sheet portions to form the first of the laminations of the stack.

2. The apparatus of claim 1 wherein said control means comprises means for varying the stroke of said punch means.

3. The apparatus of claim 1 wherein said projection extends from the lamination from which it is formed a distance substantially equal to the thickness of the lamination.

4. The apparatus of claim 1 wherein said sheet portions include an opening adjacent the projection.

5. The apparatus of claim 1 wherein said sheet portions include an opening, said aperture extending into said opening.

6. The apparatus of claim 1 wherein said sheet portions further define an annular array of slots, said punching means providing said projections and apertures in indexed relationship to said slots.

7. The apparatus of claim 1 wherein said punching means includes a cam for moving said punch, and means for controlling the movement of the cam for selectively varying the stroke of the punch to provide selectively said projections and the blanking out of the projection of said first sheet portion.

8. The apparatus of claim 1 wherein means are provided for transferring the laminations from the blanking station in the form of an interlocked stack with said first blanked out lamination lowermost.

9. The apparatus of claim 1 further including means for press fitting the interlocked projections and apertures of the stacked lamination, and means for subsequently transferring the press fitted interlocked laminations as a stack from the blanking station.

10. The apparatus of claim 1 further including means for press fitting the interlocked projections and apertures of the stacked laminations, and means for subsequently transferring the press fitted interlocked laminations as a stack from the blanking station in sequentially indexed relationship to define a skewed axis dynamoelectric machine.

* * * * *